United States Patent [19]

Naito et al.

[11] Patent Number: 5,060,185

[45] Date of Patent: Oct. 22, 1991

[54] FILE BACKUP SYSTEM

[75] Inventors: Jiro Naito, Ninomiya; Fumio Ito, Oiso, both of Japan

[73] Assignee: NCR Corporation, Dayton, Ohio

[21] Appl. No.: 316,272

[22] Filed: Feb. 27, 1989

[30] Foreign Application Priority Data

Mar. 25, 1988 [JP] Japan .................................. 63-69962

[51] Int. Cl.⁵ ....................... G06F 15/21; G06F 12/16
[52] U.S. Cl. ................................. 364/900; 364/918.5; 364/943.91; 364/945; 364/944.2; 364/962; 364/962.1; 364/966.5; 364/405; 371/10.1; 902/22

[58] Field of Search ... 364/200 MS File, 900 MS File, 364/200, 900, 405; 902/22; 235/381, 375; 371/10.1

[56] References Cited

U.S. PATENT DOCUMENTS

| 3,866,182 | 2/1975 | Yamada et al. | 364/200 |
| 4,169,288 | 9/1979 | Fairman et al. | 364/900 |
| 4,319,326 | 3/1982 | Uchida | 364/405 |
| 4,590,551 | 5/1986 | Mathews | 364/200 |
| 4,683,536 | 7/1987 | Yamamoto | 364/408 |
| 4,733,392 | 3/1988 | Yamaguchi | 371/21 |
| 4,771,382 | 9/1988 | Shiono et al. | 364/405 |
| 4,859,838 | 8/1989 | Okiharu | 364/404 X |

FOREIGN PATENT DOCUMENTS 0141245 5/1985 European Pat. Off.
0187523 7/1986 European Pat. Off.

OTHER PUBLICATIONS

Patent Abstracts of Japan, vol. 8, No. 183 (P-296)(1620), Aug. 23, 1984, and JP, A, 5975349 (Hitachi Seisakusho K.K.) Apr. 28, 1984.

Primary Examiner—Gareth D. Shaw
Assistant Examiner—P. V. Kulik
Attorney, Agent, or Firm—Wilbert Hawk, Jr.; Albert L. Sessler, Jr.; George J. Muckenthaler

[57] ABSTRACT

A file backup system for POS data includes a master terminal and a backup terminal along with a master file and a backup file, all of which are coupled to a plurality of satellite terminals. A file controller is provided for each of the files. When one of the files is down, the master file is capable of copying the contents of the down file while simultaneously responding to a request from any terminal and controlling the transfer of data without stopping the operation of the system.

10 Claims, 4 Drawing Sheets

FILE BACKUP SYSTEM

CROSS-REFERENCE TO RELATED APPLICATIONS

File Control System, Ser. No. 316,271, filed Feb. 27, 1989, invented by Mikihiko Sugiyama, Hiromi Yamamoto, and Jincheng Yang and assigned to NCR Corporation.

Link Control System, Ser. No. 316,270, filed Feb. 27, 1989, invented by Sadao Morita, Haruo Shimasaki, and Kiyohiko Tsutsumi and assigned to NCR Corporation.

BACKGROUND OF THE INVENTION

In the field of data processing, the use of point of sale (POS) terminals has required and also has enabled rapid and accurate transfer of information from one location to another in a business operation. In the case of department stores, the sales data must be transmitted or communicated from one or more terminals throughout the store to a central computer or processing unit.

A filing system is used to provide and maintain inventory and price data on the huge number of items that are sold in the store. The filing system and the control therefor provide means for retrieving and updating data and information regarding the constantly changing inventory and prices for the overall operation.

Representative documentation in the field of file backup systems includes Japanese Patent Specification No. 209642/87 which discloses point of sale (POS) data files provided in a master terminal and in a master backup terminal and wherein both terminals update the data files in response to a request from a satellite terminal and transmit PLU (price look up) data to the satellite terminal.

U.S. Pat. No. 4,319,326, issued to Y. Uchida on Mar. 9, 1982, discloses a plurality of electronic cash registers and a consolidator unit which includes means for storing data corresponding to data for each operator of the registers.

U.S. Pat. No. 4,590,551, issued to R. D. Mathews on May 20, 1986, discloses a master processor and a slave processor with local memory and dual memory control circuits. The two units access a common shared memory and contention is resolved by logic of the master processor.

U.S. Pat. No. 4,683,536, issued to M. Yamamoto on July 28, 1987, discloses a plurality of credit terminals and one of such terminals collects sales data from other terminals and transmits such data to the host computer.

U.S. Pat. No. 4,733,392, issued to K. Yamaguchi on Mar. 22, 1988, discloses fail memory equipment with a plurality of memory blocks which can be changed serially or in parallel for testing.

And, U.S. Pat. No. 4,771,382, issued to F. Shiono et al. on Sept. 13, 1988, discloses a master ECR for interrogating the state and data contents of a slave ECR wherein a state indicating signal exists to indicate whether a reset operation or a read operation has been conducted. The operator of the master machine can monitor the state of each slave machine.

In a conventional point of sale (POS) system, the construction is such that POS data files are provided in both a master terminal and in a backup master terminal. The master terminal is designed to update a file and to transmit data such as price look up (PLU) data and the like to a satellite terminal in response to a request from such satellite terminal. Additionally, in a conventional system, the latest sales information and the like is recorded in the POS data file, so that when any one of the files is down or destroyed, the system operation is temporarily stopped to copy data in a normally operating file to the down or destroyed file for re-preparation of such down or destroyed file. Further, it is a problem in a conventional system that when a file is down or destroyed due to failure of hardware or any other cause, the file cannot be prepared unless the system operation is stopped. In other words, when a file is down or destroyed during operation of the system, the file may not or cannot be re-prepared until the business closes even after the hardware is repaired. In this regard, the system has to operate with only one file after another file is down or has been destroyed and it is possible that the system may fail which would stop the operation if the remaining file is down or is destroyed.

SUMMARY OF THE INVENTION

The present invention relates to a file backup system in a point of sale (POS) system for processing sales information or data on sold goods. The sales information or data is input to the file control system from a plurality of individual satellite type POS terminals. The file control system is constructed such that when a file device including a data file and a file control section or file controller is down or fails in operation or is destroyed, a backup file device automatically takes over the processing of the sales information on the sold goods.

The system of the present invention is constructed such that even when one of the files is down or is destroyed, the main file device is capable of re-preparing the destroyed file in the up-to-date state. This re-preparing of the destroyed file to the updated state is accomplished while responding to a request from each terminal, while retrieving and updating the file, and while controlling the communication of data all in a manner or arrangement wherein the destroyed file can be automatically re-prepared without stopping the operation of the system.

In accordance with the present invention, there is provided a file backup system comprising a master device and a plurality of satellite devices adapted to input sales information on sold goods, and a plurality of file devices including point of sale data files and file control sections adapted to retrieve and update said point of sale data files in a response to a request from said master device or any of said satellite devices and to control data communication with said master device or with any of said satellite devices, said plurality of file devices being constructed such that any one of said file devices acts or operates as a main file device to control file retrieving and updating operations and data communication within the system and to control the updating of said point of sale data files of the remaining file devices and any one of said remaining file devices operates as a main file device when said main file device has failed, and said main file device is constructed such that, when said point of sale data file of one of said remaining file devices is destroyed, said main file device is capable of copying contents from its own file to said point of sale data file that failed in the up-to-date state while at the same time performing normal file retrieving and updating operations and controlling operation of the data communication.

In view of the above discussion, a principal object of the present invention is to provide a file backup system in a POS system which can respond rapidly to a request from a satellite terminal.

Another object of the present invention is to provide a file backup system for a plurality of satellite terminals wherein the operational failure rate of the various devices in the system is reduced.

An additional object of the present invention is to provide a file backup system for use in a POS system for processing sales information on sold goods input from each POS terminal.

A further object of the present invention is to provide a file backup system in a POS system having a plurality of data files and wherein any one of the data files operates as the main file and is capable of re-preparing another file as a backup file without stopping operation of the system when a backup file is down, has failed or is destroyed.

Additional advantages and features of the present invention will become apparent and fully understood from a reading of the following description taken together with the annexed drawing.

DESCRIPTION OF THE PREFERRED EMBODIMENT

Figure 1:
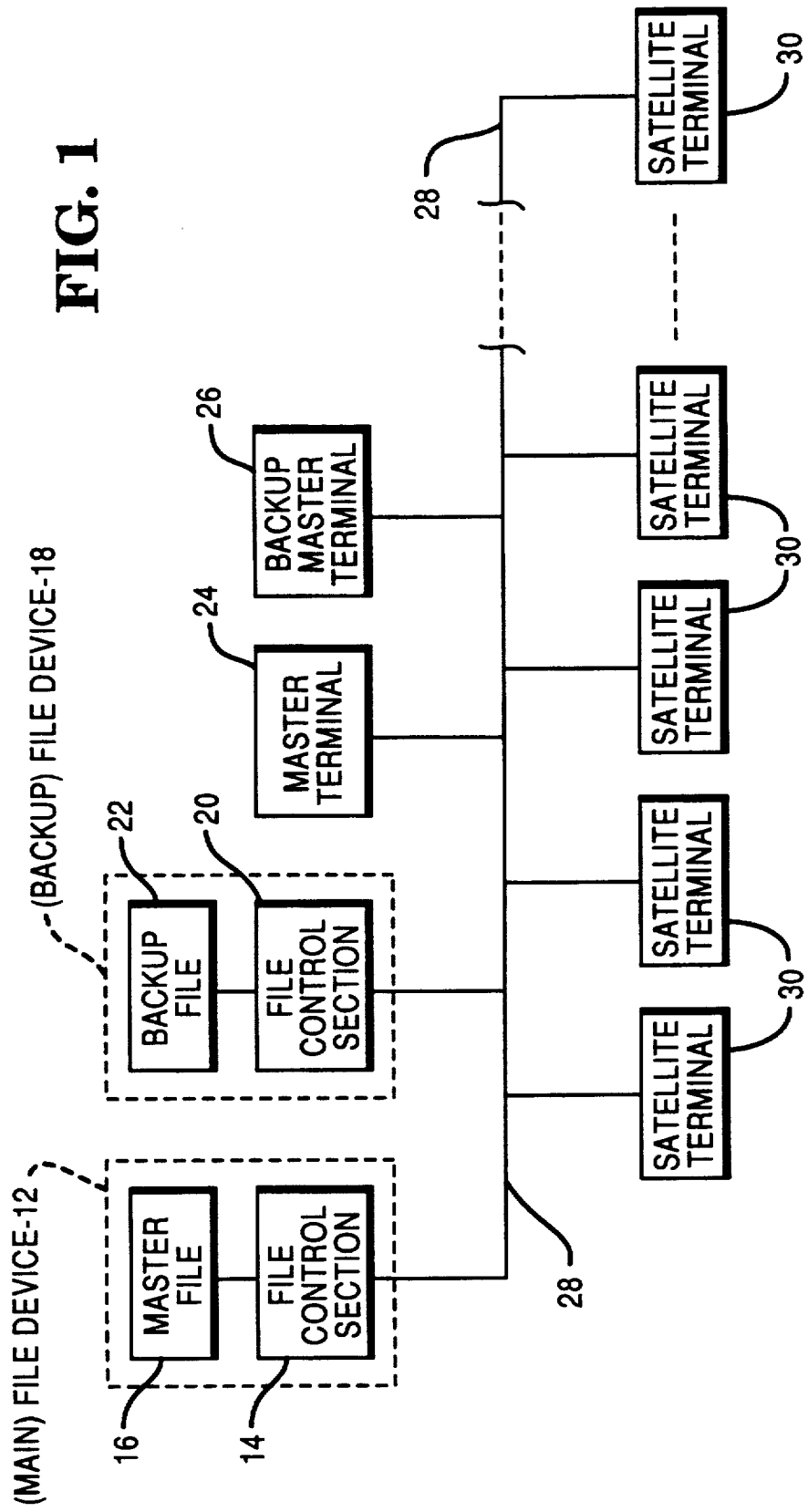
FIG. 1 is a block diagram showing the structure of the file backup system according to a preferred embodiment of the present invention.

FIG. 1 is a block diagram showing the structure of a preferred embodiment of the present invention. In the drawing, a main file device 12 includes a file controller or file control section 14 and a master file 16 in which point of sale (POS) data is stored. A backup file device 18 includes a file controller or file control section 20 and a backup file 22 in which POS data is stored. The file controller 20 has the same structure as file controller 14 and backup file 22 is the same as the master file 16. A master terminal 24 and a backup master terminal 26 are coupled by means of an in-house communication line or circuit 28. A plurality of satellite terminals 30 each consisting of a POS terminal such as an electronic cash register (ECR) or the like are coupled to the terminals 24 and 26 and to the file devices 12 and 18. All the elements 12, 18, 24, 26 and 30 are connected together via the in-house communication line or circuit 28.

The master terminal 24 and the backup master terminal 26 are constructed in the same manner as that of a conventional master terminal and a backup master terminal except that file control sections for controlling the POS data file are not included in the terminals 24 and 26. Each of the satellite terminals 30 is constructed in the same manner as that of a conventional POS terminal such as an ECR or the like. In this connection, although the backup master terminal 26 is provided in this embodiment, the provision thereof can be freely selected. Further, although only one set of backup file devices 18 is provided in this embodiment, a plurality of such backup file devices may be provided. In addition, such a structure is also possible when the file control devices 14 and 20 and the master file 16 and the backup file 22 are provided in the master terminal 24 and in the backup master terminal 26 and no file devices 12 and 18 are provided therein. However, in the just-mentioned structure, a response to the request from each satellite terminal 30 may be delayed and thus prolong the operation.

Figure 2:
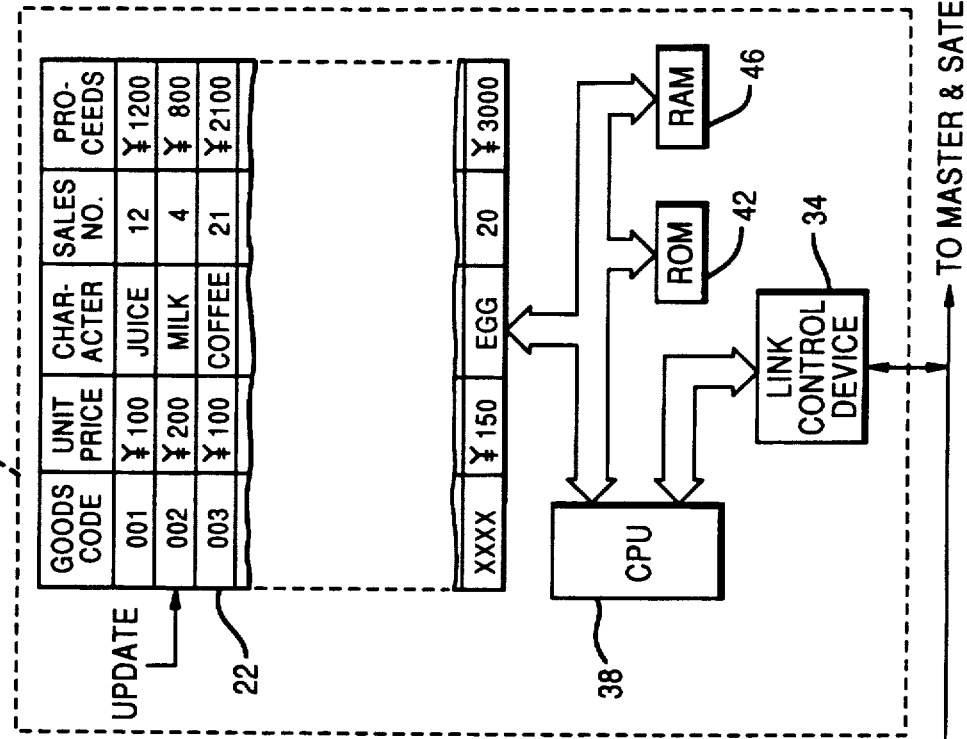
FIG. 2 is a block diagram showing the structures of the file devices illustrated in FIG. 1.

As shown in FIG. 2, the main file device 12 and the backup file device 18, respectively, consist of link control devices 32 and 34, central processing units (CPU) 36 and 38, read only memories (ROM) 40 and 42, random access memories (RAM) 44 and 46 and the master file 16 and the backup file 22. The CPU 36, the ROM 40, the RAM 44 and the link control device 32 correspond to the file control section 14 in FIG. 1. The main file device 12 and the backup file device 18 include identical elements and are constructed in exactly the same manner. Alternatively, the files 16 and 22 may be respectively included within the RAMs 44 and 46. Each of the link control devices 32 or 34 is a line control device for controlling the in-house communication line or circuit 28. The operations of the main file device 12 and the backup file device 18, which have been described in relation to FIG. 1, are respectively controlled by the CPUs 36 and 38 in accordance with processing procedures respectively stored in the ROMs 40 and 42.

Figure 3:
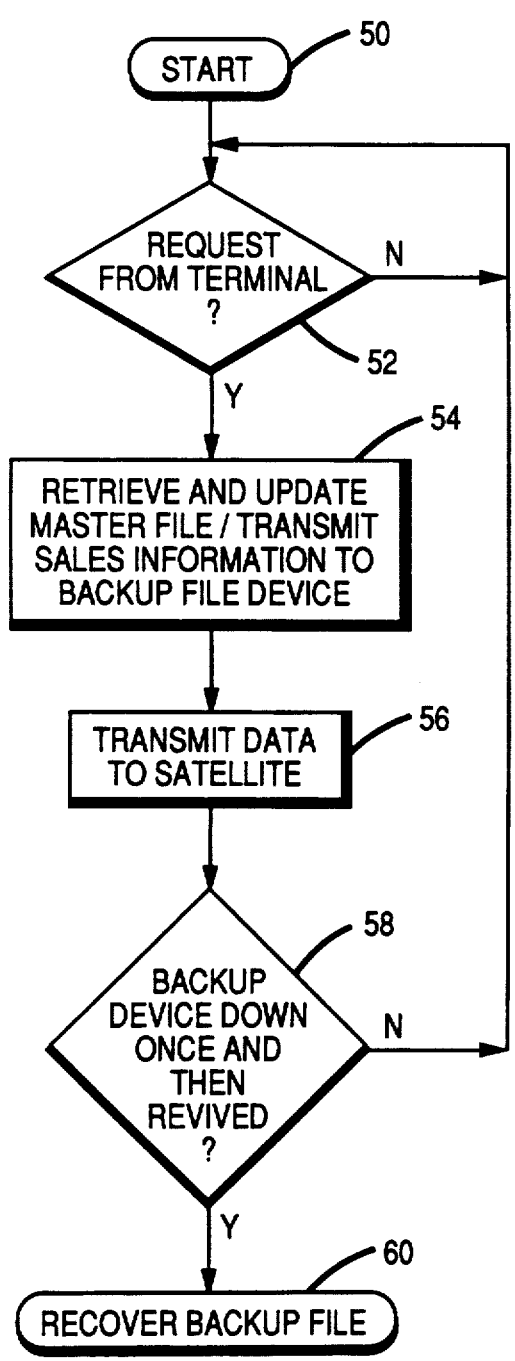
FIG. 3 is a flow chart illustrating the operation of the main file device.
Figure 4:
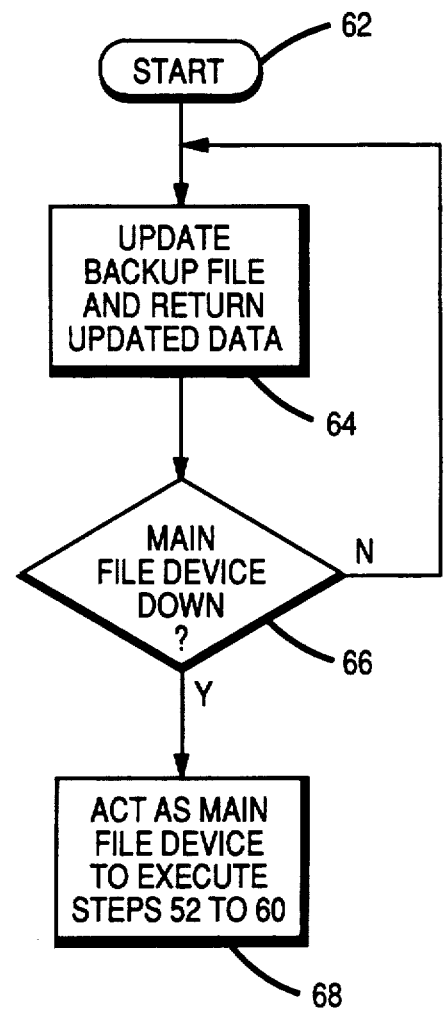
FIG. 4 is a flow chart illustrating the operation of the backup file device.

The normal operation of the file backup system according to the embodiment shown in FIG. 1 and the backup operation thereof in case of failure of the main file device 12 will be described in relation to FIGS. 1, 2, 3 and 4. FIG. 3 is a flow chart illustrating the simplified operation of the file control section 14 of the main file device 12 and FIG. 4 is a flow chart illustrating the simplified operation of the file control section 20 of the backup file device 18.

The power source is turned on to start the operation (block 50). The main file device 12 sequentially polls the individual terminals 24, 26 and 30 within the system in a predetermined cycle to confirm the presence or absence of the data transmission or receiving request from the terminal (block 52).

When a customer buys goods, the codes thereof and the number of goods sold are input from a bar code reader (not shown) or a keyboard (not shown) of any one of the master terminal 24, or the backup terminal 26 or the satellite terminal 30. The goods codes and the number of sold goods (sales information) thus input are sent over the line or circuit 28 to the main file device 12 when the main file device 12 polls the respective terminals 24, 26 or 30. The main file device 12 receives the sales information from the terminals 24, 26 or 30 and transmits such information to the backup file device 18 and simultaneously retrieves the master file 16 based on the goods code (block 54). The main file device 12 retrieves the goods code from the master file 16, updates the sales information or the like relating to the concerned goods code (block 54) and then transmits the goods data (prices or the like) corresponding to the goods code to the respective terminal 24, 26 or 30 from which the sales information has been transmitted (block 56). The terminal 24, 26 or 30 which receives the transmitted goods data from the main file device 12 registers the goods thus sold based on the received goods data.

Then, the main file device 12 checks to see whether or not the backup file device 18 has been down once and then revived (block 58). If the backup file device 18 has not been down or is not maintained in the down state, the flow returns to block 52 in FIG. 3 to repeat the same processing. In case the backup file device 18 has been down once and then revived, the flow goes to block 60 in FIG. 3 to recover the backup file data for the re-preparation of the backup file 22 in the backup file device 18.

On the other hand and as noted from the start 62 in FIG. 4, the backup file device 18 which receives the sales information from the main file device 12 updates the backup file 22 in the same manner as the main file device 12 and then transmits the data thus updated to the main file device 12 (block 64). The main file device 12 compares the updated data received from the backup file device 18 with the updated data of its own to see whether or not the backup file 22 is correctly updated (block 64). Then, the flow goes to block 66 to confirm whether or not the main file device 12 is down (block 66). In case the main file device 12 is down, the backup file device 18 acts as the main file device to control the data communication with each terminal 24, 26 or 30 (block 68), and executes the steps 52 to 60 in FIG. 3.

The operations of the file control sections 14 and 20 shown in FIGS. 1 and 2 are described in detail in co-pending application Ser. No. 316,271, filed on the same date as the present application and entitled "File Control System".

Figure 5:
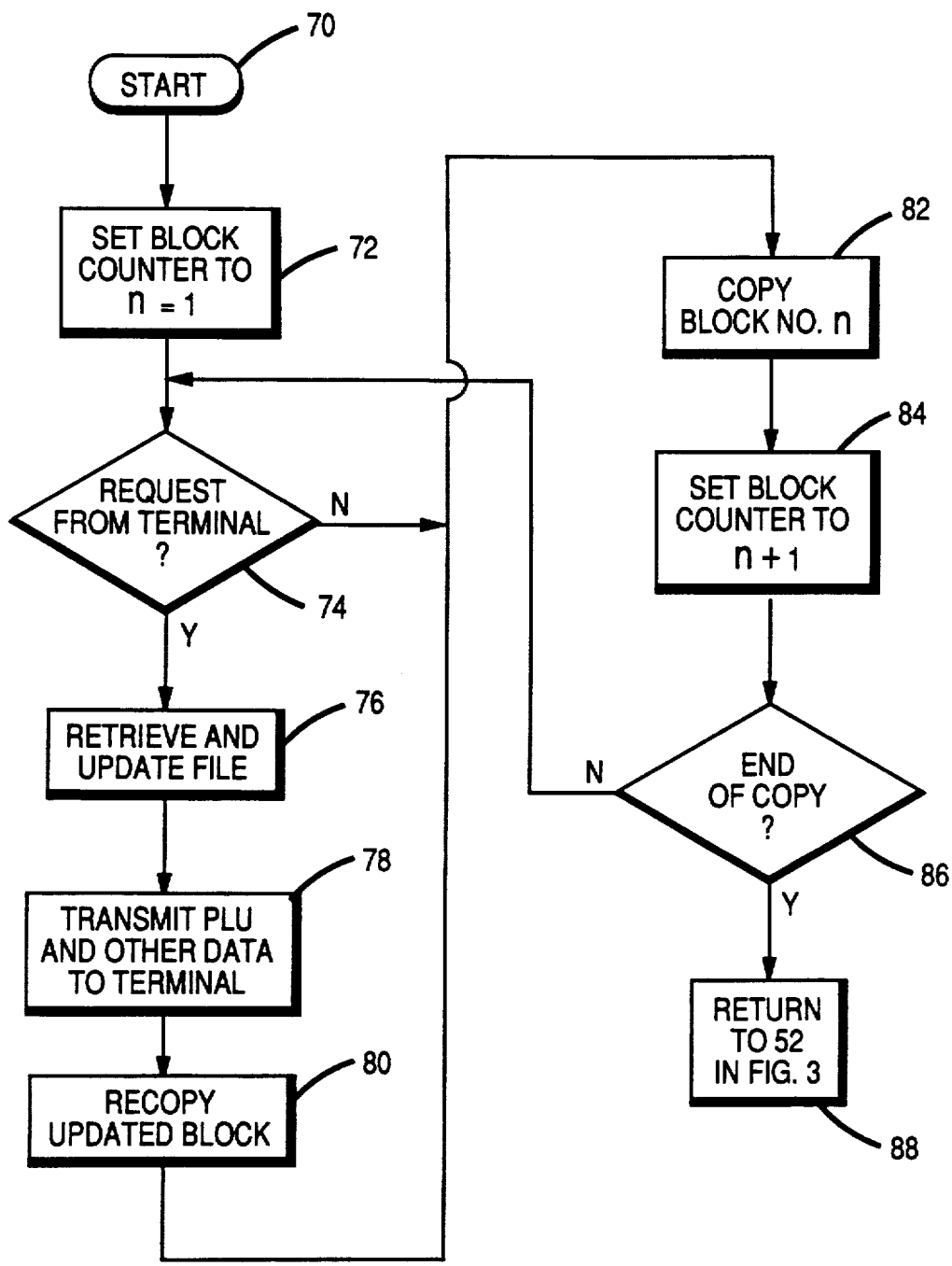
FIG. 5 is a flow chart illustrating the backup file recovering operation.

Next, the operation relating to the backup file recovering process in block 60 of FIG. 3 will be described with reference to FIG. 5. FIG. 5 is a flow chart illustrating the backup file recovering procedure of the main file device for the re-preparation of the backup file during the operation of the system.

It is assumed that the repairing of the original main file device 12 is completed after the original main file device 12 has been down and the power source is turned on (block 70). Now, the file device 18 is in operation as the main file device, so that such main file device 18 senses the completion of the repairing of the original main file device 12 (block 58) to perform the backup file recovering operation (block 60), as shown in FIG. 3.

In a first step in FIG. 5, a block counter, arranged as a copy block in order to copy the contents in the backup file 22 into the file 16, is set to n=1 (block 72). Then, a check is made to see whether or not a request is sent from a terminal (block 74) and, if not, the flow goes to block 82 in which the block n(n=1), indicated by the block counter, is copied from the backup file 22 into the file 16. Then, the block counter is set to n+1 (block 84) and a check is made to see whether or not all the contents in the backup file 22 have been copied into the file 16 (block 86). If all the contents have not been copied, the flow returns to block 74 to repeat the same process.

Next, the case in which a request is sent from a terminal 24, 26 or 30 will be described with reference to FIGS. 2 and 5.

Assume that the request for the goods code "002" is sent from a terminal 30 when the block counter is set to n=30. The main file device 18 senses the request from the terminal 30 in block 74 and goes to block 76 (FIG. 5) wherein the master file 22 is retrieved to update the sales information of the goods code "002" such as the sales number (the number of sold goods) and the proceeds, as in the case in block 54 in FIG. 3. Now, assuming that one carton of milk is sold, the sales number changes from 3, which is the previous sales number, to "4", as shown in FIG. 2, and the proceeds change from 600 to 800. Then, as noted in FIG. 5, the main file device 18 transmits the data such as the unit price "200" to the terminal 30 from which the request is sent (block 78) and thereafter the main file device 18 re-copies the block of the requested goods code "002" in the file 22, just updated, into the file 16 which is being copied in the file device 12 (block 80). Then, the main file device 18 goes to block 82 to copy the block (n=30) and repeat the copying operation, as mentioned above. At the completion of copying of all blocks, the main file device 18 goes from block 86 to block 88 and then returns to block 52 in FIG. 3. The file device 12 acts as the backup file device to repeat the steps in blocks 64, 66 and 68 in FIG. 4.

As has been described above, the present invention is constructed such that even if one of the files is destroyed, the main file can copy the contents in the master file into the file thus destroyed in the up-to-date state, while retrieving and updating the file in response to the request from each terminal 24, 26 or 30 and controlling the data communication therewith. In this manner, the file backup system in which the contents in the master file can be copied into the backup file, even during the operation of the system, can be accomplished and the backup file device can be put into operation immediately after the completion of repairing of the machine without stopping the system. Accordingly, the present invention is effective to provide a file backup system that reduces the chances of the system being down.

It is thus seen that herein shown and described is a file backup system that enables rapid response to requests from terminals. When one of the file devices has failed or is down, another file device becomes the main file device and copies the content of the one file device to maintain the operation. The structure and arrangement enable the accomplishment of the objects and advantages mentioned above, and while a preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A file backup system comprising a master device and a plurality of satellite devices positioned for inputting sales information on sold goods, and a plurality of file devices including point of sale data files and file control sections for retrieving and for updating said point of sale data files and to provide an up-to-date state of said data files in response to a request from said master device or any of said satellite devices and to control data communication with said master device or with any of said satellite devices during operation of the system, said plurality of file devices being coupled with each other such that any one of said file devices operates as a main file device to control file retrieving and updating operations and data communication within the system and to control the updating of said point of sale data files of the remaining file devices and any one of said remaining file devices operates as a main file device when said main file device has failed, and said main file device being coupled with said remaining file devices such that, when said point of sale data file of one of said remaining file devices is destroyed, said main file device retrieves said one of said remaining file devices and while updating the data file therein is responsive to a request from one of said master or satellite devices to transmit updated data to one of said master or satellite devices and then recopies the updated data contents from its own file to said point of sale data file that failed in the up-to-date state while at the same time performing normal file retrieving and updating operations and controlling operation of the data communication.

2. The system of claim 1 wherein said file devices are coupled with each other such that any one of said file devices operates as the main file device to re-prepare another file device as a backup file to maintain operation of the system.

3. The system of claim 1 including an in-house communication line for coupling said master device and said satellite devices to said plurality of file devices.

4. The system of claim 1 including counting means for counting the contents of one file that is copied into another file.

5. A file backup system for a point of sale operation comprising a master terminal and a plurality of satellite terminals coupled to the master terminal and positioned for inputting sales information on sold goods, and a plurality of file devices including point of sale data files and associated file controllers for retrieving and for updating said point of sale data files and to provide an up-to-date state of said data files during system operation in response to a request from said master terminal or from any one of said satellite terminals and to control data communication with said master terminal or with any one of said satellite terminals, said plurality of file devices being coupled with each other such that any one of said file devices operates as a main file device to control retrieving and updating operations and data communication within the system and to control the updating of said point of sale data files of the remaining file devices and wherein any one of said remaining file devices automatically operates as a main file device when said main file device has failed, and said main file device is coupled with said remaining file devices such that, when said point of sale data file of one of said remaining file devices has failed, said main file device retrieves said one of said remaining file devices and while updating the data file therein is responsive to a request from one of said master or satellite terminals to transmit updated data to one of said master or satellite terminals and then recopies the updated contents from its own file to said point of sale data file that failed in the up-to-date state while at the same time performing normal file retrieving and updating operations and controlling operation of data communication.

6. The system of claim 5 wherein said file devices are coupled with each other such that any one of said file devices operates as the main file device to re-prepare another file device as a backup file in the copying of file contents to maintain operation of the system.

7. The system of claim 5 including an in-house communication circuit for coupling said master terminal and said satellite terminals to said plurality of file devices.

8. A method of providing a file backup system for a point of sale operation having a plurality of satellite terminals coupled to a master terminal, comprising the steps of:

providing a plurality of file devices including point of sale data files and associated file controllers for retrieving and for updating said point of sale data files and to provide an up-to-date state of said data files in response to a request from said master terminal or from any one of said satellite terminals and to control data communication with said master terminal or with any one of said satellite terminals, constructing said plurality of file devices such that any one of said file devices operates as a main file device to control retrieving and updating operations and data communication within the system, controlling the updating of said point of sale data files of the remaining file devices wherein any one of said remaining file devices automatically operates as a main file device when said main file device has failed, and constructing said main file device such that, when said point of sale data file of one of said remaining file devices has failed, such main file device retrieves said one of said remaining file devices and while updating the data file therein is responsive to a request from one of said master or satellite terminals to transmit updated data to one of said master or satellite terminals and then recopies the updated data contents of its own file into said point of sale data file that failed in the up-to-date state and re-prepares the failed data file as a backup file while at the same time performing normal file retrieving and updating operations and controlling operation of data communication.

9. The method of claim 8 wherein said file backup system includes an in-house communication circuit for coupling said master terminal and said satellite terminals to said plurality of file devices.

10. The method of claim 8 including the step of counting the contents of one file that is copied into another file that operates as a backup file.

* * * * *